(12) United States Patent
Hendren et al.

(10) Patent No.: US 9,050,878 B2
(45) Date of Patent: Jun. 9, 2015

(54) VEHICLE SLIDING DOOR ASSEMBLY (75) Inventors: Robert A. Hendren, Macomb, MI (US); Ali Tavakoli Targhi, Rochester Hills, MI (US); Alex M. Langreet, Mount Clemens, MI (US)

(73) Assignee: DURA GLOBAL TECHNOLOGIES, LLC, Auburn Hills, MI (US)

( * ) Notice: Subject to any disclaimer, the term of this patent is extended or adjusted under 35 U.S.C. 154(b) by 72 days.

(21) Appl. No.: 13/445,112

(22) Filed: Apr. 12, 2012

(65) Prior Publication Data
US 2013/0269259 A1    Oct. 17, 2013

(51) Int. Cl.
*B60J 5/04*     (2006.01)
*B60J 5/06*     (2006.01)

(52) U.S. Cl.
CPC ............... *B60J 5/0472* (2013.01); *B60J 5/047* (2013.01); *B60J 5/06* (2013.01)

(58) Field of Classification Search
USPC .................... 49/360; 296/155; 16/92, 105
IPC .................. B60J 5/0472,5/047, 5/042
See application file for complete search history.

(56) References Cited

U.S. PATENT DOCUMENTS

| | | | |
|---|---|---|---|
| 2,905,463 A * | 9/1959 | Borden ........................... | 49/360 |
| 3,006,683 A | 10/1961 | Smith et al. | |
| 3,051,999 A | 9/1962 | Schimek | |
| 3,075,803 A | 1/1963 | Wilfert | |
| 3,520,083 A | 7/1970 | Erb et al. | |
| 3,531,895 A * | 10/1970 | Appell ............................ | 49/360 |
| 3,935,674 A * | 2/1976 | Williams et al. ................ | 49/212 |
| 4,019,775 A | 4/1977 | Grossbach et al. | |
| 4,068,407 A | 1/1978 | Podolan et al. | |
| 4,135,760 A | 1/1979 | Grossbach | |
| 4,544,198 A | 10/1985 | Ochiai et al. | |
| 4,668,008 A * | 5/1987 | Stinson ......................... | 296/155 |
| 4,669,222 A * | 6/1987 | Ujihara et al. .................. | 49/374 |
| 4,869,544 A | 9/1989 | Anwyll et al. | |
| 5,507,119 A | 4/1996 | Sumiya et al. | |
| 5,524,960 A * | 6/1996 | Townsend ..................... | 296/155 |
| 5,896,704 A | 4/1999 | Neag et al. | |
| 5,921,613 A | 7/1999 | Breunig et al. | |
| 6,183,039 B1 | 2/2001 | Kohut et al. | |
| 6,328,374 B1 * | 12/2001 | Patel ............................. | 296/155 |
| 6,779,832 B2 * | 8/2004 | D'Assumcao ................ | 296/155 |
| 6,896,315 B2 | 5/2005 | Batinli et al. | |
| 7,243,461 B2 * | 7/2007 | Rogers et al. .................... | 49/360 |
| 7,658,438 B1 | 2/2010 | Elliott et al. | |
| 7,748,770 B2 | 7/2010 | Heuel et al. | |
| 7,765,740 B2 | 8/2010 | Heuel et al. | |
| 7,887,118 B2 * | 2/2011 | Elliott et al. .................. | 296/155 |
| 7,896,425 B2 | 3/2011 | Elliott et al. | |
| 7,950,109 B2 | 5/2011 | Elliott et al. | |

(Continued)

OTHER PUBLICATIONS

Written Opinion & International Search Report for PCT/US13/034110, Jul. 15, 2013, 10 pages.

*Primary Examiner* — Gregory Strimbu
(74) *Attorney, Agent, or Firm* — Reising Ethington P.C.; Matthew J. Schmidt; Dean B. Watson (57) ABSTRACT

A motor vehicle sliding door that may be supported by a pillar of the motor vehicle and having a sliding door assembly with a self-adaptive carriage. The self-adaptive carriage can allow for attachment of the door to the vehicle body at the A, B, or C pillars with reduced movement efforts and increased stability while accommodating manufacturing tolerance variation over large scale production runs.

15 Claims, 5 Drawing Sheets

(56) References Cited

U.S. PATENT DOCUMENTS

| | | |
|---|---|---|
| 7,950,719 B2 | 5/2011 | Elliott et al. |
| 7,954,880 B2 * | 6/2011 | Kunishima et al. ........... 296/155 |
| 8,087,336 B2 | 1/2012 | Fleischer et al. |
| 8,485,587 B2 * | 7/2013 | Thiele ........................ 296/155 |
| 2009/0200833 A1 | 8/2009 | Heuel et al. |
| 2010/0254638 A1 | 10/2010 | Traiser |
| 2011/0146161 A1 | 6/2011 | Heuel et al. |
| 2012/0031004 A1 | 2/2012 | Boettcher |

\* cited by examiner

VEHICLE SLIDING DOOR ASSEMBLY

TECHNICAL FIELD

This disclosure relates generally to a sliding door assembly for use in opening and closing a vehicle door.

BACKGROUND OF THE DISCLOSURE

Vehicle doors that may be opened and closed by way of movement generally parallel to the vehicle body have been installed on conventional vans and mini-vans at their side-rear location for many years. The mechanisms on these types of doors control the movement of the door with a guide provided in the vehicle body, such as at the roof line, along the bottom at the floor or in slots along the side of the vehicle body. Suggestions have been made to change the control mechanism and mounting of the door to allow the door to be attached to one of the A, B or C pillars of the vehicle. However, despite efforts for over 40 years, there are no motor vehicles that include such sliding doors in commercial production and on the road today. The development efforts are demonstrated by U.S. patent literature including: U.S. Pat. Nos. 3,006,683; 3,051,999; 3,075,803; 3,520,083; 3,935,674; 4,019,775; 4,068,407; 4,135,760; 4,544,198; 5,507,119; 5,896,704; 5,921,613; 6,183,039; 7,658,438; 7,748,770; 7,765,740; 7,887,118; 7,896,425; 7,950,109; 7,950,719; 8,087,336; 2009/0200833; and 2010/0254638.

As discovered by the inventors hereof, changing the control mechanism and mounting position of the door creates a number of problems associated with door stability and the effort required to slide or move the door when trying to adapt the technology to modern automotive vehicle quality standards in large scale production runs. As such what is needed is a different solution.

SUMMARY OF THE DISCLOSURE

A motor vehicle sliding door that may be supported by a pillar of the motor vehicle and having a sliding door assembly with a self-adaptive carriage. A self-adaptive carriage can allow for pillar attachment of the door to the vehicle body at one or more of the A, B, or C pillars with reduced movement efforts and increased stability while accommodating manufacturing tolerance variation over large scale production runs.

In at least some implementations, a sliding door for a motor vehicle includes a sliding door assembly for moving the door longitudinally and transversely relative to a vehicle body between open and closed positions. The sliding door assembly may include a guide rail and a self-adaptive carriage. The self-adaptive carriage captures and interacts with the guide rail over the travel length of the guide rail and flexes at any given position at least 0.1 mm and, in at least some implementations, no more than 1.4 mm.

In one implementation there is disclosed a guide rail that includes a rolling surface. The self-adaptive carriage is slidably received by the guide rail and has at least one roller biased against the rolling surface. During relative movement between the guide rail and carriage, the roller can stay in contact with the rolling surface and move relative to the carriage to accommodate at least some variances in the rolling surface. In one embodiment there are multiple roller assemblies that simultaneously engage the guide rail wherein at least one roller assembly engages a rolling surface at an angle transverse to an angle of engagement of at least one other roller assembly.

In one implementation, there is described a sliding door assembly that pivots and slides to move a vehicle door longitudinally outboard of a vehicle body. The sliding door assembly includes a bearing arm, a guide rail, and a self-adaptive carriage. The bearing arm is mounted between a vehicle body and the self-adaptive carriage. The guide rail has a guide track defining at least two rolling surfaces arranged at different angles. The self-adaptive carriage has a body that is pivotably attached to the bearing arm and slidably received by the guide rail. The carriage may include a roller assembly with one or more rollers. In one embodiment at least one roller is yieldably biased against a rolling surface of the guide rail by a biasing member. The biasing member permits movement of one or more rollers relative to the carriage body to accommodate variances in the rolling surfaces as the adaptive carriage translates relative to the guide rail. The door assembly may also include a guide curve and control arm that dictate the path of movement of the door as it moves between open and closed positions.

BRIEF DESCRIPTION OF THE DRAWINGS

The following detailed description of preferred implementations and best mode will be set forth with regard to the accompanying drawings which show various aspects of the invention that themselves can be interchangeable with other embodiments and so can be combined individually or as groupings in other ways, in which.

DETAILED DESCRIPTION OF PREFERRED EMBODIMENTS

Figure 1:
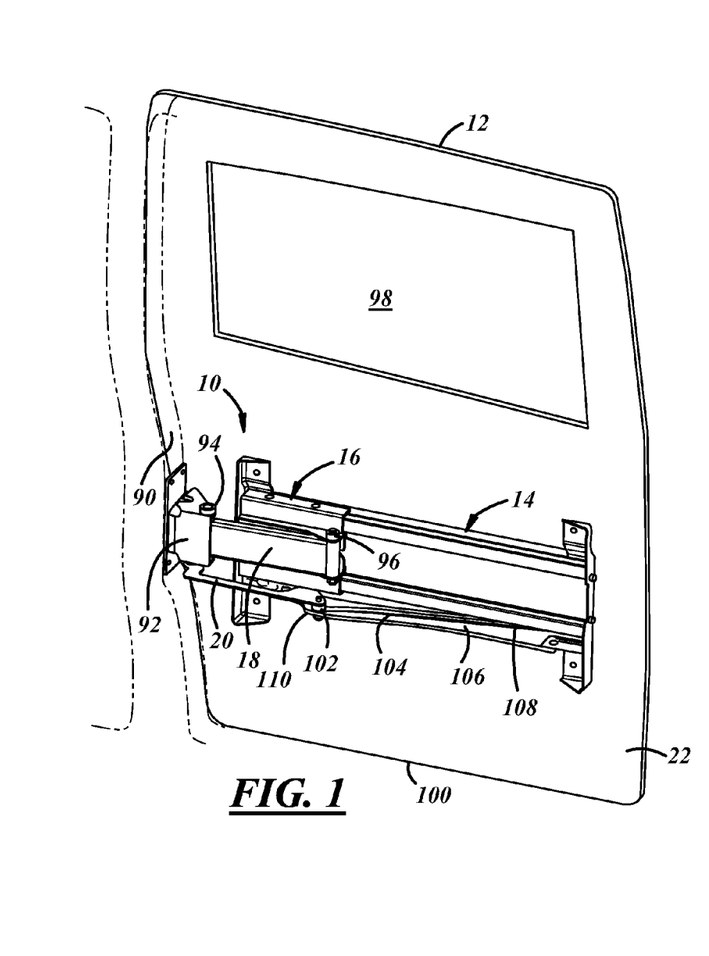
FIG. 1 is a perspective view of an interior of a vehicle door showing a sliding door assembly when the vehicle door is closed.
Figure 2:
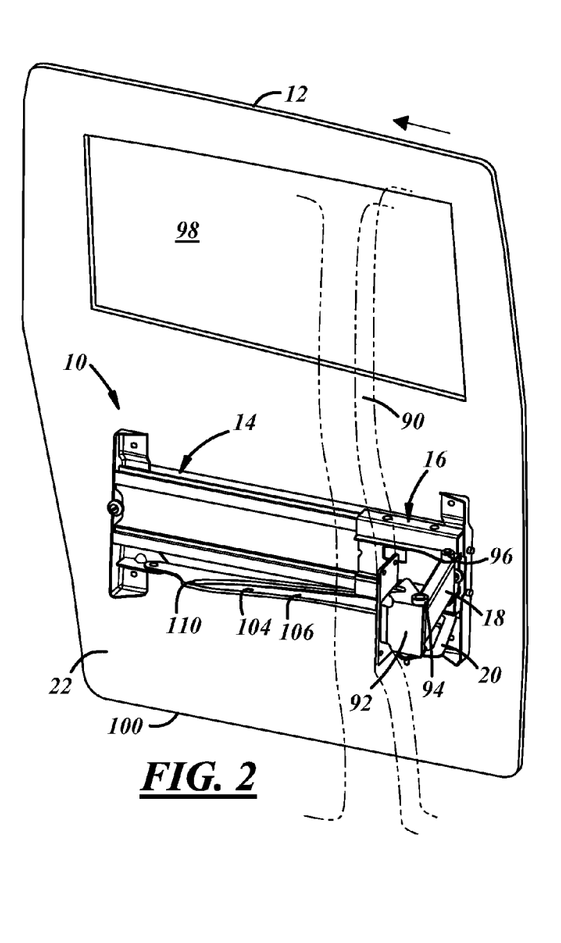
FIG. 2 is a perspective view like FIG. 1 showing the sliding door assembly when the vehicle door is open.
Figure 3:
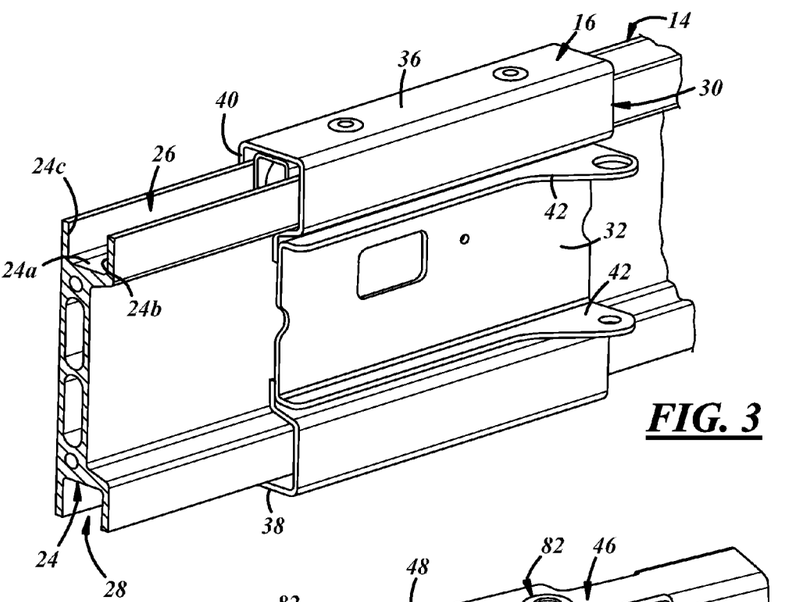
FIG. 3 is a partial perspective view of a guide rail and a self-adaptive carriage received by the guide rail according to one embodiment.

Referring in more detail to the drawings, FIGS. 1 and 2 illustrate a vehicle door 12 that may be used, for example, on a motorized vehicle such as a sedan, pick-up truck, delivery vehicle, or other such vehicle. Instead of the traditional pivoted connection between the door and vehicle frame, the illustrated door 12 includes a sliding door assembly 10 that permits the door 12 to pivot inwardly and outwardly relative to a door opening in the vehicle body and to translate generally parallel to the body as the door travels between open and closed positions relative to the door opening.

The sliding door assembly 10 as shown herein includes a self-adaptive carriage 16 that is mated or otherwise associated with a guide rail 14. The self-adaptive carriage 16 may be any suitable translating device. Preferably the self-adaptive carriage 16 supports the weight of the door 12. The guide rail 14 is preferably attached to the door 12, and as such will move with the door and relative to the self-adaptive carriage 16.

In one implementation, the self-adaptive carriage 16 may include a roller 44 that is biased along the travel length of the guide rail 14. The roller 44 may be biased against a rolling surface of the guide rail 14. In one aspect the biased roller can engage the rolling surface to facilitate more consistent rolling engagement along with lower slide efforts and enhanced door stability.

For purposes of general understanding it is noted that the vehicle body has a longitudinal axis that extends between the front and rear ends of the vehicle generally co-linear with the straight-ahead forward and straight-behind reverse driving directions. Reference to longitudinal movement of the vehicle door generally refers to movement in the direction of the longitudinal axis and reference to lateral movement generally refers to movement in a direction substantially transverse to the longitudinal axis. Also, the term "sliding" is used broadly in this application to include any longitudinal movement of the door and does not require one component of the door assembly to slip or slide relative to another component. Instead, "sliding" as used with regard to the "sliding door assembly" may include gliding, rolling, sliding or other forms of motion.

The sliding door assembly 10 determines the kinematics of the vehicle door 12 in relation to the vehicle body (not shown) and is able to control movement of the door 12 from a closed position (FIG. 1), in which the door 12 may be nestled within the door opening generally flush with adjacent areas of the vehicle body, and an open position (FIG. 2), in which the door 12 is pivoted then moved laterally outboard of the vehicle body and longitudinally displaced from the door opening. Moving the door 12 between its open and closed positions can be performed manually or by an on-board mechanical actuator such as, for example, a motor. The sliding door assembly 10 may include a guide rail 14, an adaptive carriage 16, a bearing arm 18, a control member 20, a guide curve 106 and a pillar mount or pivot 92.

The guide rail 14 may be mounted to the vehicle door 12 such as on an interior side 22 of the vehicle door 12, as shown best in FIGS. 1-4. One or more, and preferably several, rolling surfaces 24 are part of or carried by the guide rail 14. The one or more rolling surfaces 24 allow the guide rail 14 to translate relative to the adaptive carriage 16 as the vehicle door 12 moves between its open and closed positions. Several different constructions of the guide rail 14 and its accompanying rolling surface(s) 24 may be employed. For example, in this particular embodiment, the guide rail 14 includes an upper guide track 26 and an opposite facing lower guide track 28. The guide tracks 26, 28 are defined by opposite facing transverse base rolling surfaces 24a and a pair of spaced apart and opposed vertical rolling surfaces 24b, 24c extending outwardly from the base rolling surface 24a. As may be understood by the invention in general and the entire disclosure, it is also contemplated that numerous other arrangements can be accomplished and still fall within the scope of the invention.

The self-adaptive carriage 16 may include a main body 30 and at least one roller 44 adapted to engage a rolling surface 24a-c of the guide rail 14. In the embodiment shown, the carriage 16 includes the main body 30, a bracket 32, and one or more roller assemblies, with two roller assemblies 34, being shown best in FIGS. 3-6.

The main body 30 is any structure that may support the one or more roller bearings or rollers 44, which rollers may be carried by the roller assemblies 34, 35 or otherwise supported. The main body 30 can be made in any suitable way and may be an extruded, stamped, rolled, or other type of formed or bent metal sheet. In the implementation shown, the main body 30 captures at least a portion of the guide rail 14 which can be accomplished by any suitable structure, such as by the main body 30 surrounding at least a portion of the guide rail 14. The main body 30 may have an upper wall 36 located adjacent the upper guide track 26, a lower wall 38 located adjacent the lower guide track 28, and a sidewall 40 interconnecting the upper and lower walls 36, 38. The bracket 32 may be carried by the main body 30 and includes a pair of spaced apart mounting flanges 42. In the implementation shown, the first roller assembly 34 is carried by the self-adaptive carriage 16 adjacent to the upper wall 36 for receipt in the upper guide track 26 of the guide rail 14, and the second roller assembly 35 is carried by the carriage 16 adjacent to the lower wall 38 for receipt in the lower guide track 28. The first and second roller assemblies 34, 35 may be constructed in the same manner and so only the first roller assembly 34 is described here in more detail.

Figure 4:
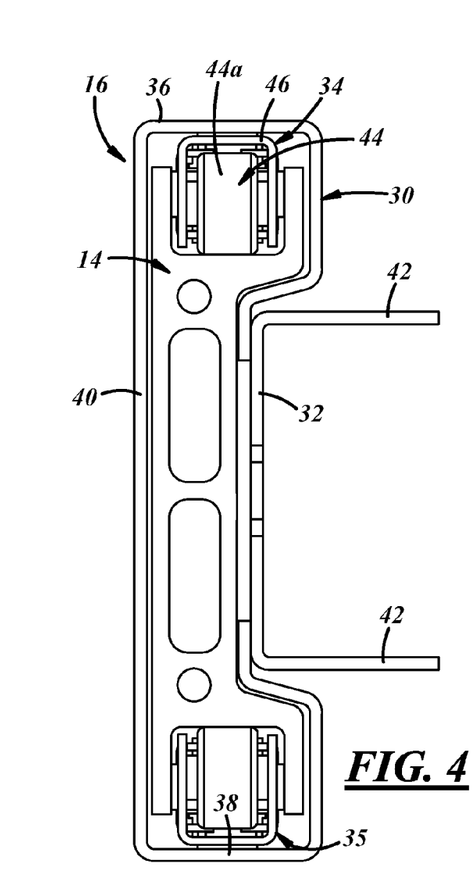
FIG. 4 is a side view of the guide rail and carriage as in FIG. 3.

The roller assembly 34 can be any device capable of moving and guiding that has one or more rollers 44. The roller 44 can be any device capable of rolling and/or providing a bearing or support surface for relative movement between the guide rail and self-adaptive carriage. In one embodiment the roller 44 may include or be a wheel or roller bearing supported by a hub. The construction of the roller assembly 34 and the manner in which it carries the one or more rollers 44 can vary. For example, the first roller assembly 34 as shown includes one or more brackets. Each bracket carries at least one roller 44. A first roller bracket 46 includes a main body 48 and, at each end, a pair of depending mounting flanges 50 that are spaced apart and adapted to carry a roller 44a between the flanges 50. In this way, the first roller bracket 46 carries a pair of rollers 44a, with one roller 44a at each end of the main body 48. And as shown in FIG. 4, the rollers 44a carried by the first roller bracket 46 extend beyond a lower edge 52 of the flanges 50 so that the rollers 44a may engage and roll along the base rolling surface 24a of the guide rail 14. The first roller bracket 46 may further include one or more openings 54 to facilitate connecting the roller assembly 34 to the main body 30 of the self-adaptive carriage 16 by mechanical fasteners 56 such as, for instance, bolts, rivets or machine screws.

A second roller bracket 58 is shown that includes a main body 60 with spaced apart openings 62 defined at each end of the body 60 by a pair of mounting flanges 64. These openings 62 are adapted to carry a roller 44b. Here, the rollers 44b extend beyond a side surface 66 of the main body 60 so that the rollers 44b may engage and roll along the side surface 24b of the guide rail 14. A third roller bracket 68 may be constructed similarly to the second roller bracket 58. The rollers 44c carried by the third roller bracket 68, however, are arranged to engage and roll along the opposite side surface 24c of the guide rail 14. The first, second, and third roller brackets 46, 58, 68 are thus arranged to engage and roll along each of the three rolling surfaces 24a-c of the upper guide track 26 to provide a stable slidable connection between the self-adaptive carriage 16 and the guide rail 14 that resists bending moments and supports the weight of the vehicle door 12 when moved. The brackets and rollers of the second roller assembly 35 may be constructed and arranged in similar manner to provide rollers engaging the rolling surfaces of the lower guide track 28.

The second and third roller brackets 58, 68 may be coupled to the first roller bracket 46 which, as previously mentioned, may be connected to the main body 30 of the of the adaptive carriage 16. The brackets 46, 58, 68 may be directly connected together or, in the particular implementation shown, they may be separately connected to a core 70. The core 70, if used, may be located between the brackets 46, 58, 68 and include a plurality of side openings 72 that permit the connection of the second and third brackets 58, 68 by mechanical fasteners 74 such as bolts, screws, or rivets. Moreover, the core 70 may include openings 76 aligned with the openings 54 of the first roller bracket 46 to receive the mechanical fasteners 56 that traverse the first roller bracket 46 and connect that bracket 46 and the core 70 to the main body 30 of the self-adaptive carriage 16. If desired, the core 70 may be an integral body formed from a single piece of material.

The rollers 44a-c may be carried on axles 78a-c, that are accommodated by openings 80a-c defined in their respective mounting flanges of the brackets 46, 58, 68. The position of the rollers 44a-c relative to at least a portion of the main body 30 of the carriage 16 may be adjustable; that is, the rollers 44a-c may be moveable to help sustain contacting rolling engagement between the rollers 44a-c and their rolling surfaces 24a-c even though variances in the shape or dimensions of the rolling surfaces 24a-c may exist. The adjustability of the rollers 44a-c may also help them maintain an appropriate engagement with and resistance to rolling along the rolling surfaces 24a-c so that the vehicle door 12 does not wobble or feel loose, or feel too tight and require too much force to move, as the guide rail 14 translates relative to the self-adaptive carriage 16 during movement of the door 12.

The rollers 44a-c may be self-adjusting such as by being yieldably biased against the rolling surfaces 24a-c by one or more biasing members associated with the self-adaptive carriage 16. The biasing members may be any flexible and at least somewhat resilient members that permit at least one roller to move relative to at least a portion of the carriage. That is, the biasing members may permit the self-adaptive carriage to flex wherein at least a portion of the carriage 16 (e.g. its main body, roller bracket(s) or rollers) moves relative to a different portion of the carriage.

Figures 5, 7:
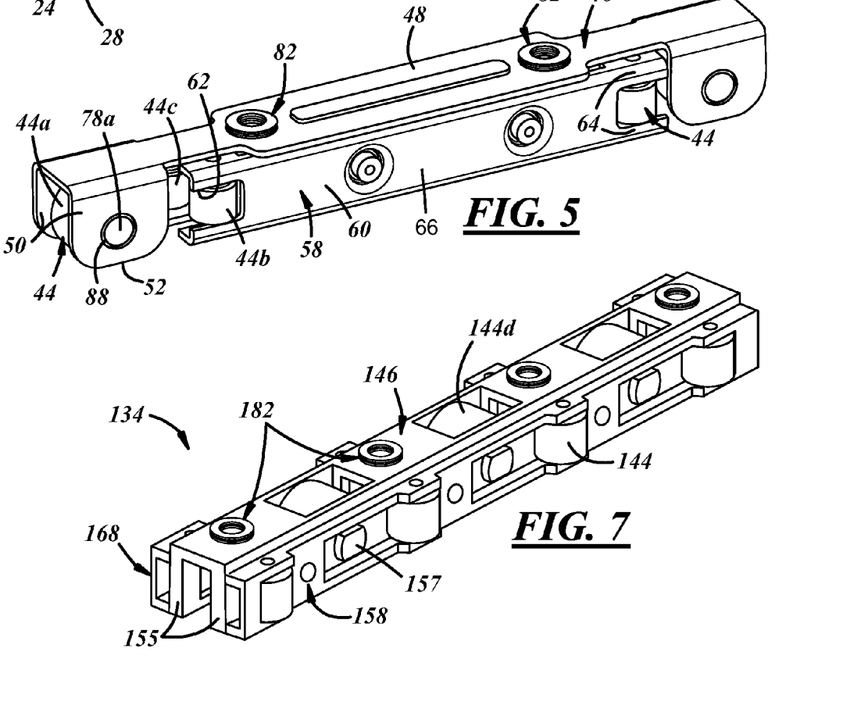
FIG. 5 is a perspective view of a roller assembly that includes a plurality of rollers according to one embodiment.
FIG. 7 is a perspective view of a roller assembly that includes a plurality of rollers according to another embodiment.
Figure 6:
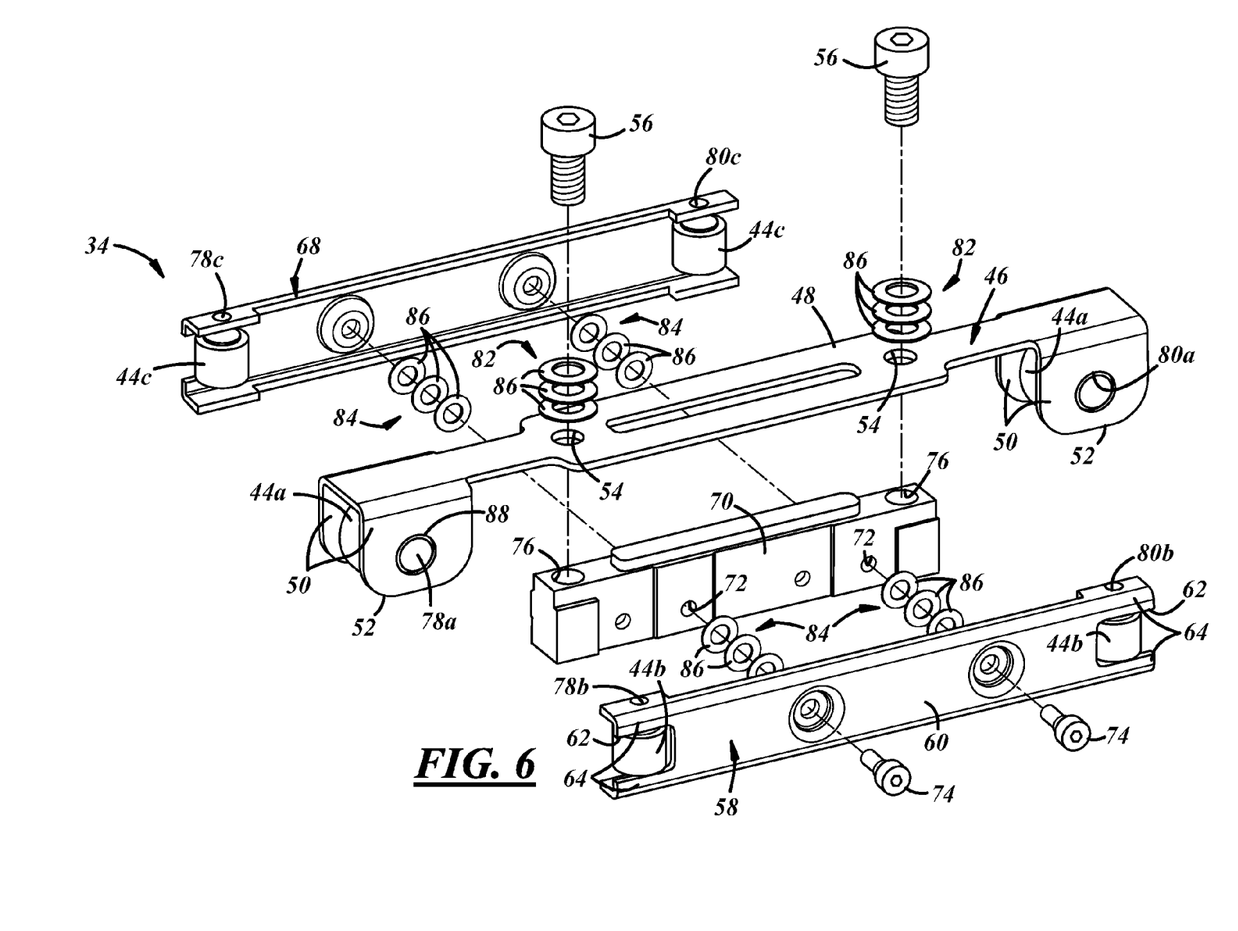
FIG. 6 is an exploded perspective view of the roller assembly illustrated in FIG. 5.

Flexing of the carriage 16 may be accomplished in many ways, with one example being to provide one or more biasing members between the carriage main body and one or more roller brackets. This permits movement of one or more roller brackets relative to the carriage main body 30 as accommodated by the biasing members, permits movement of the rollers 44 relative to at least a portion of the main body 30. As shown in FIGS. 4-6, for example, one or more biasing members 82 may be situated between the upper wall 36 of the carriage main body 30 and the first roller bracket 46. Likewise, one or more biasing members 84 may be situated between the core 70 and the main bodies of the second and third roller brackets 58, 68. These biasing members 82, 84 may be compressed to allow the first roller assembly 34 to be interference fit within the upper guide track 26 so that one or more rollers may be yieldably biased into engagement with one or more of the rolling surfaces 24a-c of the guide track 26. Hence, when installed, the rollers are preloaded by an amount equal to the interference fit of the roller assemblies in the guide track.

Once installed, the biasing members 82, 84 provide the carriage 16 and rollers 44a-c with enough resilient leeway to react to variances in the interface between the guide rail 14 and carriage 16, which variances are likely to exist in production runs of these components. For example, variances in the contour or dimensions of the rolling surfaces 24a-c as the guide rail 14 is moved relative to the roller assembly 34 which can cause the biasing members to be further compressed or permit expansion of the biasing members as they return toward their uncompressed state. This compression and/or expansion of the biasing members happens autonomously during the relative movement of the carriage and guide track.

Stated differently, due to the flexing of the carriage 16 and/or movement of the rollers, the axis of rotation of the rollers 44a-c can remain in generally the same position relative to their respective rolling surfaces 24a-c, even if the rolling surfaces are not smooth and planar, or if the construction of the guide rail and carriage are different (e.g. due to normal production variations) from one sliding door assembly to the next. In this way, for example, the rollers 44b, 44c that engage the side rolling surfaces 24b, 24c can move relative to at least a portion of the main body 30 of the self-adaptive carriage 16 to accommodate variations in the dimensions of one or both guide tracks 26, 28 along the travel length of the self-adaptive carriage 16. Further, a desired number of rollers, up to and including all of the rollers, may remain in contact with the guide track surfaces during the full range of movement between the carriage and guide rail. The term "self-adjusting" is used here because the movement of the rollers 44 to accommodate changes in the guide track 26 happens automatically or autonomously under the force of the track 26 on the rollers 44 and the biasing force provided on the rollers 44 by the biasing members.

The biasing members 82, 84 that facilitate flexing of the carriage 16 and adjustability of the rollers 44a-c may be any type of elastic or spring-like object. For example, without limitation, as shown in FIGS. 4 and 6, the biasing members 82, 84 may be one or more disc springs 86 that may be fitted, individually or in stacked relation, circumferentially around the mechanical fasteners 56, 74 which connect the several roller brackets 46, 58, 68. Other types of elastic or spring-like objects may of course be used as the biasing members 82, 84 including one or more helical compression springs, an elastomeric material, or a combination of any such objects, to name but a few alternative options that may be compressed and resiliently expand, or flexed and resiliently return toward their unflexed shape, in use.

In another implementation of the self-adjustable rollers 44a-c, a biasing member 88 may be circumferentially fitted around one or more of the axles 78a-c and against the openings 80a-c defined in the mounting flanges of the brackets 46, 58, 68 (shown in FIG. 6 associated with one of the rollers 44a only). This biasing member 88 is preferably a tolerance ring. Such rings are radially compressible and, for that reason, provide some room for the axles 78a-c to movably react when the rollers 44a-c encounter variances in the rolling surfaces 24a-c. The use of tolerance rings around the axles 78a-c may be employed alone or in conjunction with the biasing members 82, 84 associated with the roller brackets 46, 58, 68 to render the rollers 44a-c self-adjustable. As the rollers 44a-c are part of the carriage 16, movement of the rollers can be considered to be a form of flexing of at least a portion of the carriage 16.

The bearing arm 18 may be any structure adapted to carry at least some of the weight of the vehicle door 12, and connect the door to, for example, a pillar 90 (for example, an A, B, or C pillar) of the vehicle body. The bearing arm 18 may be constructed to laterally move the vehicle door 12 into and out of the door opening so that longitudinal movement of the door 12 can occur outboard of the vehicle body. The bearing arm 18, as shown here, may be pivotably attached at one end to a pillar mount 92 that is connected to the pillar 90 and at its other end to the mounting flanges 42 of the self-adaptive carriage 16. Such pivoted attachment may be effectuated by hinges 94, 96 positioned proximate the pillar mount 92 and the self-adaptive carriage 16, respectively. The general design and operation of the bearing arm 18, its specific construction, and the many available design variations are all well understood by skilled artisans and, as such, a more complete description need not be provided here.

In the example shown, the vehicle door 12 includes a window 98 in its upper portion, and the bearing arm 18 is coupled to the door 12 below the window 98 and above a lower edge 100 of the door 12, for example, adjacent to a middle of the door 12. When mounted in this manner, forces applied to the upper or lower portions of the vehicle door 12 tend to tilt the door 12 relative to the vehicle body, that is, the forces put a bending moment on the bearing arm 18, the guide rail 14, and the self-adaptive carriage 16 that tends to laterally tilt the door 12. Similarly, forces applied closer to a front side or rear side of the vehicle door 12 can also tilt or tend to rotate and at least partially open the door 12 about its point of connection to the bearing arm 18 (which is generally the self-adaptive carriage 16) which may be between the front and rear sides of the door 12.

The control member 20 may be any structure capable of guiding the lateral and longitudinal movement of the vehicle door 12 between its open and closed positions. The control member 20 may be pivotably attached, at one end, to the pillar mount 92 and, at its other end, to the self-adaptive carriage 16. The control member 20 includes an intervening guide hinge 102 constrained within a slot 104 defined in a guide curve 106. This slot 104 provides a defined path between a forward end 108 (shown in FIG. 2) and a rearward end 110 (shown in FIG. 1) of the guide curve 106 through which the guide hinge 102 can travel. As the guide hinge 102 travels along the defined path of the slot 104, the control member 20 and the bearing arm 18 cooperatively control the lateral movement of the vehicle door 12 and set the angle of the door, relative to its opening and the vehicle body generally, as the door moves laterally and longitudinally into and out of its opening. In this construction and arrangement, there is one degree of freedom in the sliding door assembly 10. That is, movement of any part of the door 12 will cause movement in the other components, as discussed below.

Referring now back to FIGS. 1-5, and starting with the vehicle door 12 in the closed position, operation of the sliding door assembly 10 begins when the vehicle door 12 is initially opened (either manually or by a powered actuator). At that point, the guide rail 14 begins translating relative to the self-adaptive carriage 16 and the guide hinge 102 of the control member 20 begins moving along the guide curve 106 from the rearward end 110 towards the forward end 108. As the guide hinge 102 navigates the defined path of the slot 104, the bearing arm 18 pivots about the hinges 94, 96 positioned proximate the pillar mount 92 and the self-adaptive carriage 16, respectively, causing the vehicle door 12 to move laterally outboard of the vehicle body and also longitudinally part of the way toward the fully open position of the door. The guide hinge 102 then continues to travel towards the forward end 108 of the guide curve 106. This generally coincides with the guide rail 14 further translating relative to the self-adaptive carriage 16 and further longitudinal movement of the vehicle door 12 away from the door opening. Eventually, the self-adaptive carriage 16 reaches its stopping point on the guide rail 14, and the vehicle door 12 is then in its fully open position. This same process works in reverse when the door 12 is returned to the closed position.

Movement between the guide rail 14 and the self-adaptive carriage 16 is controlled at least in part by the rollers 44$a$-$c$ and their engagement with the guide tracks 26, 28. The adaptive nature of the carriage 16 may keep the rollers 44$a$-$c$ biased against their associated rolling surfaces 24$a$-$c$ so that contacting rolling engagement is adequately maintained between the guide rail 14 and the self-adaptive carriage 16 even if variances in the rolling surfaces 24$a$-$c$ are present within any given guide rail or over a production run of guide rails. In other words, the rollers 44$a$-$c$ may be yieldably biased to permit movement of the axis of rotation of the rollers 44$a$-$c$ relative to at least a portion of the main body 30 of the self-adaptive carriage 16 when at least certain variances in the guide rail 14 are encountered by the rollers 44$a$-$c$, as previously mentioned, and/or to accommodate variances in the size or shape of the carriage 16 and guide rail 14. The biasing members may permit the carriage to flex in an amount to accommodate the minimum and maximum tolerance stack up in the guide rail and carriage, to maintain the rollers in contact with the guide rail and to maintain the force needed to move the guide track relative to the carriage within an acceptable range.

The biasing members permit the self-adaptive carriage 16 to flex and adapt to the guide rail 14, and thereby permit the position or orientation of the rollers 44$a$-$c$ to change. This flexing of the self-adaptive carriage 16 and movement of the rollers 44$a$-$c$ may be permitted by the biasing members acting directly on the rollers 44$a$-$c$ themselves, or on other portions of the self-adaptive carriage 16, such as between one or more brackets and the main body 30 of the carriage 16 and/or between one or more brackets and the core 70. The main body 30 could also be formed in more than one piece, with flexing between pieces of the body 30 being possible to permit flexing of the carriage 16 and movement of the rollers 44$a$-$c$. Of course, other arrangements are possible to permit flexing of the self-adaptive carriage 16, where flexing of the carriage 16 is considered broadly to include relative movement between components of the carriage 16. Such flexing of the carriage 16 can maintain a desired interface between the carriage 16 and the guide rail 14.

In use, the self-adaptive carriage 14 may flex at least 0.1 mm at any given position along the travel length of the guide rail 14 relative to the carriage 16. In at least some implementations, a more rigid carriage 16 that does not flex can increase the effort needed to move the vehicle door 12 along areas of lesser clearance between the carriage 16 and the guide rail 14. In at least some embodiments, so that the vehicle door 12 does not feel too loosely connected to the vehicle, the self-adaptive carriage 16 flexes no more than 1.4 mm over the length of travel of the guide rail 14. In other words, in at least some implementations, if the biasing members permit too much flexing of the carriage 16 and/or movement of the rollers 44$a$-$c$, they may not provide enough force between the self-adaptive carriage 16 and the guide rail 14 and the door 12 may feel loose or unstable as it is moved, or an undesired magnitude of lateral movement of the door 12 relative to the vehicle may be possible. The biasing members may have a stiffness ranging from 268 N/mm to 7,300 N/mm. Such biasing members may provide a resilient force that enables the appropriate displacement or flexing of the carriage to accommodate tolerances in the carriage and guide rail under the application of various loads in operation of the sliding door, as noted above.

Without the adaptive carriage 16, the variable force that may be needed to move the vehicle door 12 can be unsatisfactory to a user manually moving the door 12, as the door 12 may feel too loose when there is less resistance to movement of the rollers 44$a$-$c$ and too tight and difficult to move when there is more resistance to movement of the rollers 44$a$-$c$. The vehicle door 12 may feel loose, for example, when the rollers 44a-c are in sections of the guide tracks 26, 28 where the distance is greater than desired between the side rolling surfaces 24b, 24c of the guide tracks 26, 28 and/or the distance between the base rolling surfaces 24a of the upper and lower guide tracks 26, 28 is less than desired over all or a portion of the length of travel. And the door may require too much force to move when there is more resistance to movement of the rollers 44, for example, where the distance is less than desired between the side rolling surfaces 24b, 24c of the guide tracks 26, 28 and/or the distance between the base rolling surfaces 24a of the upper and lower guide tracks 26, 28 is greater than desired over all or a portion of the length of travel.

In a power operated door, the varying force that may be needed to move the vehicle door 12 can cause problems with the drive mechanism (e.g. motor). That is, the actuator or motor may have to be larger than otherwise needed to ensure that the door 12 can be moved in the worst case scenario with maximum resistance to movement of the rollers 44a-c. Or, the maximum force needed to move a vehicle door 12 may be greater than can be provided by the drive mechanism, or the force may unduly strain the drive mechanism and shorten its useful life.

With the self-adaptive carriage 16, variances in the guide rail 14 or the carriage 16, or in production runs of these components, can be accommodated while maintaining a desired force on the rollers 44a-c and between the guide rail 14 and self-adaptive carriage 16. Thus, even with such variances, the slide effort needed to move the vehicle door 12 can remain more consistent which may be more desirable to an end user and more readily permit a power actuator to be incorporated for automatic door opening and closing.

In addition to or instead of being self-adjusting, if the rollers 44a-c are manually adjustable to a desired position relative to the guide tracks 26, 28, the rollers 44a-c may be better engaged with the guide tracks 26, 28 in use compared to rollers where adjustments are only possible when separated from the rolling surface 24 and outside of the guide tracks 26, 28. And because the rollers 44a-c are carried by the roller assembly 34, which is part of the self-adaptive carriage 16, as opposed to being solely affixed to an elongated guide secured at the interior side 22 of the door 12, there is less of a tendency for the rollers 44a-c and the rolling surfaces 24 to become jammed, disengaged, misaligned or out of position with respect to the carriage 16 or guide rail 14. The construction of the guide rail 14 and the self-adaptive carriage 16, their arrangement within the sliding door assembly 10, and their maintenance once assembled are also simplified. This is especially true since the roller assembly 34 or assemblies 34, 35 can be interference fit within the guide tracks 26, 28 of the guide rail 14 without having to expend significant manual labor or manage precise manufacturing tolerances.

Figure 9:
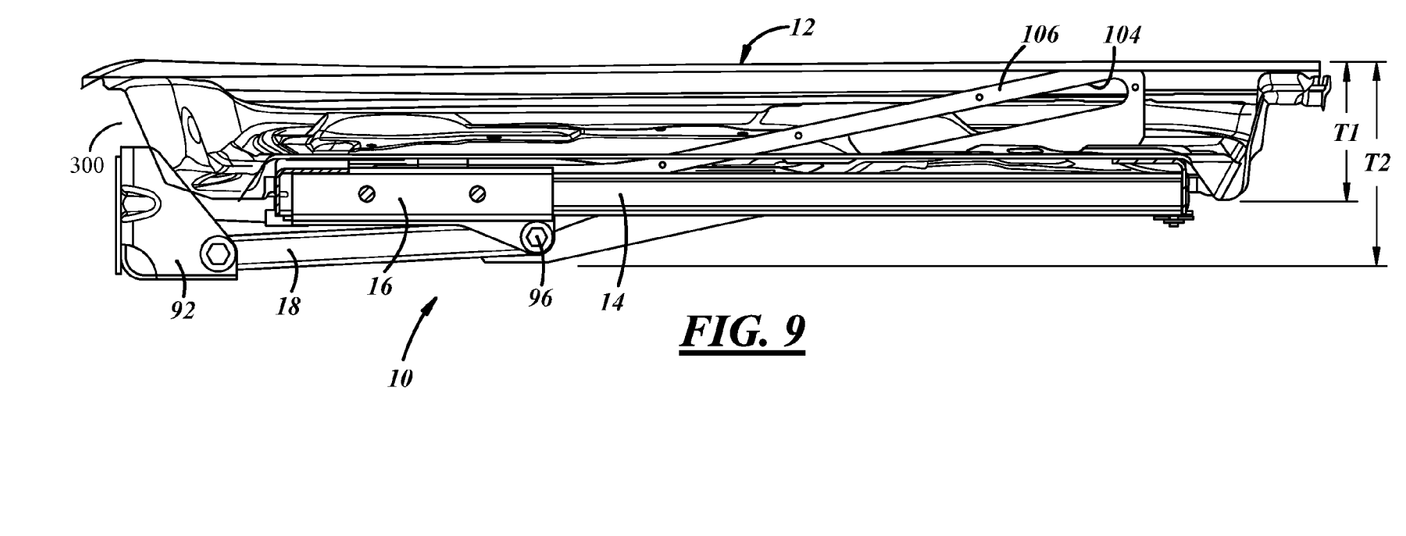
FIG. 9 is a top view of a portion of the sliding door assembly showing portions of the assembly received within a cavity or recess in the vehicle door panel.

As shown in FIG. 9, certain components of the sliding door assembly 10 can be at least partially received within the boundary of the vehicle door 12, in at least some positions of the door. For example, FIG. 9 shows the door in its closed position and the guide curve 106 and a portion (or all) of the guide rail 14 and carriage 16 may be received within a pocket or recess 300 formed in the door 12 so that the sliding door assembly 10 consumes less interior space within the vehicle passenger compartment. In this way, some of the sliding door assembly components can be accommodated within the thickness T1 of the door 12, which may include an armrest or other interior features. In at least some implementations, the guide curve, carriage and guide rail collectively have a width 'T2' (which is the dimension relative to the thickness T1 of the door 12) and the majority of that width T2 is received within the thickness T1 of the door, in at least one position of the door (for example, when the door is closed). At least a portion of the bearing arm and other sliding door components may also be disposed within the boundaries or thickness of the door. Of course, other arrangements are possible, for example where all or less than a majority (including none) of the sliding door assembly 10 is received within the door.

Figure 8:
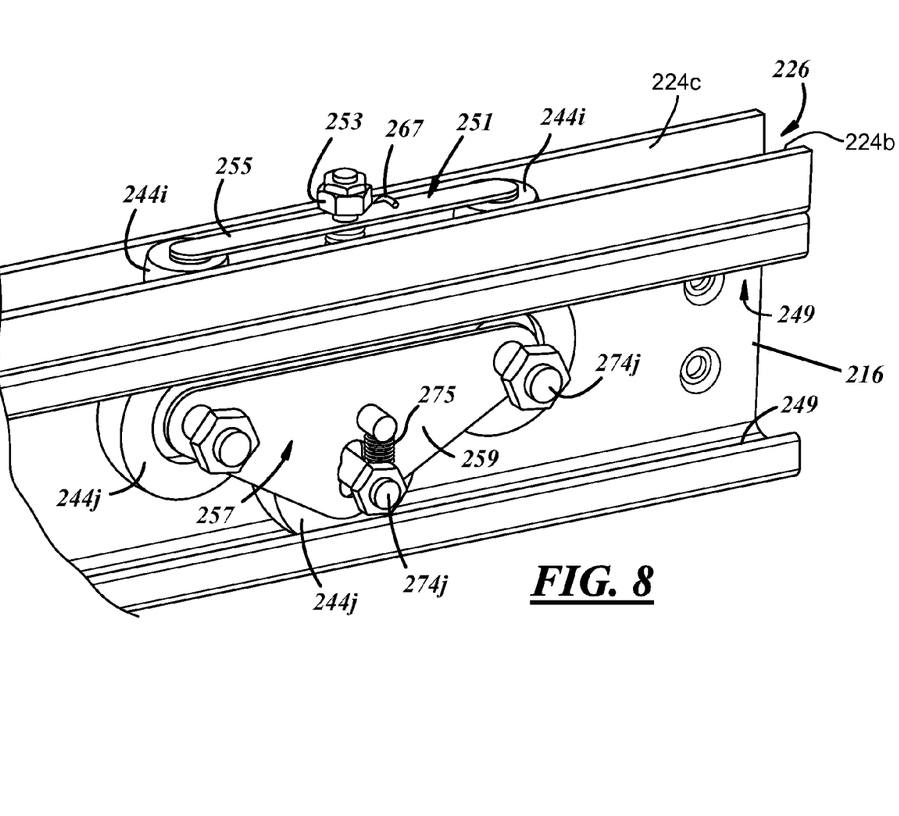
FIG. 8 is a partial perspective view of a guide rail and a self-adaptive carriage received by the guide rail according to still another embodiment.

The sliding door assembly 10 just described details a variety of structural features and design attributes that are considered to be a preferred embodiment. Skilled artisans should appreciate that a wide variety of modifications can be made to the guide rail 14, the self-adaptive carriage 16, the bearing arm 18, and the control member 20. For example, several alternative embodiments of certain parts of the sliding door assembly 10 are illustrated in FIGS. 7 and 8. Each of the illustrated alternative embodiments uses like numerals to designate like aspects of the sliding door assembly 10 where appropriate. It should also be understood that the various disclosed embodiments are not restricted to use only as disclosed and illustrated; rather, aspects of the several disclosed embodiments that perform the same function may be interchanged with one another and/or used in various combinations, if desired. Accordingly, the alternative embodiments shown in FIGS. 7 and 8 represent only some of the modifications that could be made to the sliding door assembly 10.

FIG. 7 illustrates another embodiment of the roller assembly 134 that may carry a plurality of adjustable rollers and be interference fit within one of the guide tracks 26, 28. The roller assembly 134 includes, in the same general orientation as before, a first roller bracket 146, a second roller bracket 158, and a third roller bracket 168. In this embodiment, however, there is no core as the second and third roller brackets 158, 168 are attached to a pair of side flanges 155 of the first roller bracket 146 by fasteners 157.

The carriage may be adaptive as described before. For instance, biasing members 182 may be situated between the upper wall 36 of the main body 30 of the self-adaptive carriage 16, biasing members (not shown) may be situated between the side flanges 155 of the first roller bracket 146 and the main bodies of the second and third roller brackets 158, 168, and/or biasing members (not shown) may be situated around axles that carry the rollers 144d, 144e. The same types of elastic or spring-like objects mentioned before may be employed as the biasing members in this implementation of the roller assembly 134.

As illustrated in FIG. 8, the guide rail 216 may include the upper guide track 226 and a pair of confronting interior rolling surfaces 249 beneath the upper guide track 226. A roller assembly 251 is situated in the upper guide track 226 and includes a roller bracket 255 that carries a pair of rollers 244i at opposite ends. Each of the rollers 244i is biased against one of the vertical rolling surfaces 224b-c and may be rendered self-adjustable by a torsion spring 267 circumferentially fitted around a mechanical fastener 253 that connects the roller assembly 251 to the main body (not shown) of the self-adaptive carriage 216. The torsion spring provides a force on one or two sides of the roller bracket 255 tending to rotate the bracket 255 relative to the fastener 253 to maintain one roller 244i in contact with each of the opposed vertical rolling surfaces 224b-c. That is, the diameter of each roller 244i may be less than the distance between the rolling surfaces 224b-c such that each roller 244i engages only one of the rolling surfaces 224b-c. So instead of the rollers 244i being carried by separate brackets to engage the opposed rolling surfaces, as demonstrated, for example, by rollers 44b, 44c and brackets 58, 68, the rollers 244i are carried by the same bracket 455.

Another roller assembly 257 that carries three rollers 244j is situated between the interior rolling surfaces 249. This roller assembly 257 may include a triangular body 259 that carries one roller 244j proximate each corner. The rollers 244j may be carried on the triangular body 259 by an axle 274j. Each of these three rollers 244j could be rendered self-adjustable against their respective interior rolling surfaces 241 by a biasing member, such as a spring 275 acting on an axle 274j that carries the rollers 244j and connects them to the triangular body 259. Here, vertical load support is provided by the rollers 244j and horizontal load support is provided by the rollers 244i. The two described and shown roller assemblies 251, 257 may be all that are needed to support the vehicle door 12 in use. Of course, a second roller assembly could be provided on the opposite face of the guide rail as the assembly 257 shown, and/or a roller assembly like the assembly 251 could be provided along a lower end of the guide rail generally opposite the assembly 251, if desired.

While the forms of the invention herein disclosed constitute presently preferred and several alternative embodiments, many others are possible. This disclosure is not intended to mention all the possible equivalent forms or ramifications of the invention. It is understood that the terms used herein are merely descriptive, rather than limiting, and that various changes may be made without departing from the spirit or scope of the invention.

The invention claimed is:

1. A vehicular door assembly for a motor vehicle, comprising:
   a vehicle door;
   a guide rail attached to the vehicle door, the guide rail having a first rolling surface facing a first direction, a second rolling surface facing a second direction and a third rolling surface facing a third direction, the first direction being opposite to the second direction, and the third direction being different from the first and second directions;
   a self-adaptive carriage coupled to the guide rail for relative movement between the guide rail and the self-adaptive carriage over a length of travel that is defined by the guide rail and the self-adaptive carriage, the self-adaptive carriage including a body, multiple rollers each carried by the body and adapted to rotate about an axis, the rollers engage the guide rail along at least a portion of the length of travel with at least one roller of the multiple rollers biased into engagement with the first rolling surface, at least one roller of the multiple rollers biased into engagement with the second rolling surface, and at least one roller of the multiple rollers biased into engagement with the third rolling surface;
   a bearing arm pivotably connected to the self-adaptive carriage, the bearing arm having a pillar mount adapted to be connected to a pillar of the vehicle; and
   a control member interacting with the self-adaptive carriage to set an angle of the door relative to the bearing arm along the length of travel.

2. The assembly of claim 1 wherein the self-adaptive carriage includes a biasing member that permits the self-adaptive carriage to flex between 0.1 mm and 1.4 mm along the length of travel where flexing of the self-adaptive carriage permits movement of the axis of rotation of at least one of the rollers relative to a portion of the self-adaptive carriage.

3. The assembly of claim 1 wherein the self-adaptive carriage also includes a biasing member and a roller assembly, wherein the roller assembly includes a bracket that is carried by the body and at least one of said multiple rollers is carried by the bracket, and the biasing member acts on the bracket to permit movement of the axis of rotation of said at least one of said multiple rollers that is carried by the bracket relative to at least a portion of the body.

4. The assembly of claim 3 wherein a position of the bracket relative to the body of the self-adaptive carriage is adjustable after the self-adaptive carriage is attached to the guide rail.

5. The assembly of claim 3 wherein the biasing member is a compressible member situated at least partially between the body of the self-adaptive carriage and the bracket of the roller assembly.

6. The assembly of claim 3 wherein said at least one of said multiple rollers that is carried by the bracket is carried by an axle which engages the bracket, and the biasing member acts on both the axle and the bracket.

7. The assembly of claim 3 wherein said at least one of said multiple rollers carried by the bracket is engaged with the first rolling surface.

8. The assembly of claim 7 which also comprises a second bracket and wherein at least one of said multiple rollers is carried by the second bracket and is engaged with either the second rolling surface or the third rolling surface.

9. The assembly of claim 8 wherein a second biasing member acts on the second bracket to permit movement of the second bracket relative to the body.

10. The assembly of claim 1 wherein the self-adaptive carriage includes a biasing member which is a compressible member acting on the carriage to permit movement of a portion of the self-adaptive carriage through compression and resilient expansion of the biasing member.

11. The assembly of claim 1 which also includes a guide curve and wherein at least a portion of the guide curve is positioned within boundaries of the door in at least one position of the door.

12. The assembly of claim 11 wherein the guide curve, self-adaptive carriage and guide rail collectively have a thickness and a majority of said thickness is received within a thickness of the door.

13. The assembly of claim 1 wherein the third rolling surface is perpendicular to the first rolling surface and the second rolling surface.

14. The assembly of claim 13 which also includes a fourth rolling surface that is opposed to the third rolling surface, and wherein at least one of said rollers is yieldably biased into engagement with the fourth rolling surface.

15. The assembly of claim 1 wherein the self-adaptive carriage includes a biasing member that has a stiffness between 268 N/mm and 7,300 N/mm.

* * * * *